United States Patent [19]

Schneider et al.

[11] 4,119,769

[45] Oct. 10, 1978

[54] THERMAL BATTERY HAVING IRON PYRITE DEPOLARIZER

[75] Inventors: Alan Arthur Schneider, Baltimore; George C. Bowser, Towson, both of Md.

[73] Assignee: Catalyst Research Corporation, Baltimore, Md.

[21] Appl. No.: 846,791

[22] Filed: Oct. 31, 1977

Related U.S. Application Data

[63] Continuation of Ser. No. 675,501, Apr. 9, 1976, abandoned.

[51] Int. Cl.² .............................................. H01M 6/36
[52] U.S. Cl. .................................... 429/112; 429/102
[58] Field of Search ............... 429/112, 152, 153, 149, 429/221, 217, 102

[56] References Cited

U.S. PATENT DOCUMENTS

| | | | |
|---|---|---|---|
| 3,677,822 | 7/1972 | Bush | 429/112 |
| 3,922,222 | 11/1976 | Walsh et al. | 429/221 |
| 3,930,888 | 1/1976 | Bowser et al. | 429/218 |
| 3,933,520 | 1/1976 | Gay et al. | 429/218 X |
| 4,013,818 | 3/1977 | Askew et al. | 429/112 |
| 4,044,192 | 8/1977 | Bowser, Jr. et al. | 429/112 |

Primary Examiner—Anthony Skapars
Attorney, Agent, or Firm—Reed, Smith, Shaw & McClay

[57] ABSTRACT

A thermal battery comprising at least one cell, and preferably a plurality of stacked cells wherein each cell comprises an anode of a metal selected from the group consisting of alkali metals, alkaline earth metals and alloys thereof. Positioned against each cell anode is a homogeneous mixture, preferably in wafer form, of the electrolyte, depolarizer, and binder. The active depolarizer species of the present invention comprises iron pyrite (FeS$_2$) which provides a lower internal resistance to the battery and improves start times over conventional depolarizers used in thermal batteries.

9 Claims, 3 Drawing Figures

THERMAL BATTERY HAVING IRON PYRITE DEPOLARIZER

This is a continuation of application Ser. No. 675,501 filed Apr. 9, 1976 now abandoned.

FIELD OF THE INVENTION

A thermal primary electrochemical cell having an anode, cathode and an electrolyte which are solid and non-conductive at normal temperature, and in particular, a thermal cell having as its active depolarizer iron pyrite.

BACKGROUND OF THE INVENTION

Thermal batteries are relatively well known in the art and comprise a plurality of thermal cells each of which includes an anode, a cathode, and an electrolyte and a heat source, usually an ignitable, exothermically reactive chemical charge or pyrotechnic. A variety of electrochemical systems are known for use in thermal cells.

The electrolytes are generally mixtures of alkali metal halides, most commonly a eutectic mixture of LiCl and KCl. The cathodes, generally referred to as depolarizers, comprise materials that are reduced in the electochemical cell reaction and include phosphates, metal oxides, borates and chromates. The most widely used depolarizer material is either calcium chromate or vanadium pentoxide. It is present practice to mix the electrolyte and depolarizer with a binder in powder form and press the mixture into a wafer such as set forth in U.S. Pat. Nos. 3,677,822; 3,425,872; and 3,527,615.

The most commonly used anode material is calcium, typically in the form of a coating on a nickel or iron current collector. Other materials such as magnesium and solid lithium alloys have been used. See U.S. Pat. No. 3,367,800.

Conventional thermal cells such as calcium/lithium chloride, potassium chlorides/calcium chromate experience discharge reactions in which the cell components react chemically rather than electrochemically with no electrical power generation. Such reactions result in the rapid deterioration of the cell at operating temperatures which temperatures are of a relatively narrow range. Exceeding this narrow range, of about 100° C., results in a self-discharge reaction that further heats the cell to accelerate the self-discharge creating a thermal runaway. To overcome the problem of thermal runaway, deteriorization and to provide batteries having higher energy density, higher power density and longer life, anodes comprising a foraminous inert metal substrate wettable by and filled with an electrochemically active anode metal, melting at temperatures below cell operating temperatures, were provided. U.S. Pat. Nos. 3,891,460 and 3,930,888. The anodes taught and disclosed in these patents generally comprise a housing having an impervious metal portion in electrical contact with the active anode metal, typically lithium, and a porous refractory fiber portion in sealing engagement against the periphery of the metal portion. Batteries utilizing these anodes comprise a stack of cells in recurring sequence of an anode, a wafer containing electrolyte, depolarizer and binder, and a combustible composition that serves as a heat source and a cathode current collector. These batteries are activated by heating to a temperature above the melting point of the anode metal and melting point of the electrolyte.

Batteries utilizing the improved anode structures provide substantial advantages over thermal batteries without such anodes. It is desirable in many applications, however, to have a battery wherein the internal resistance is reduced near the end of its life when a high current pulse is often required. Moreover, lower internal resistance results in improved electronic conductivity with smaller voltage drops under pulsed loads. Furthermore, in numerous applications it is desirable to decrease the start time of a thermal battery.

SUMMARY OF THE INVENTION

It is an object of the present invention to provide an improved thermal battery utilizing prior art anodes, and in particular, the molten metal anodes described and disclosed in U.S. Pat. Nos. 3,891,460 and 3,930,888. It is a further object of the invention to obtain a thermal cell having reduced internal resistance and start times.

In accordance with the present invention, the improved thermal battery comprises at least one electrochemical cell having an anode selected from metals consisting of alkali metals, alkali earth metals or alloys thereof. Preferably, the metal is lithium, calcium or an alloy of lithium and calcium. While a solid metal alloy may be used in the present invention, it is preferred that the anode comprise a housing having an impervious metal portion in an electrical contact with an active anode metal comprising a foraminous inert metal substrate wettable by and filled with an electrochemically active anode metal, such as lithium, and a porous refractory fiberous portion in sealing engagement against the periphery of the metal portion.

In contact with the porous refractory fiberous portion is a homogeneous mixture, preferably in wafer form of an electrolyte, a depolarizer consisting of iron pyrite ($FeS_2$) and a binder such as Cab-O-Sil ®. Preferably, in place of a homogeneous wafer mixture is a two-layer anolytecatholyte wafer wherein the anolyte layer, positioned adjacent the anode, comprises a pure LiCl-KCl eutectic salt and the catholyte layer comprises a mixture of iron pyrite, LiCl-KCl, and a binder.

Positioned adjacent the catholyte layer or homogeneous wafer mixture is a combustible composition such as a mixture of iron and potassium perchlorate. A plurality of such cells may be stacked in compression within a battery housing to form a thermal battery of the present invention.

Batteries utilizing the iron pyrite depolarizer of the present invention have faster start times as well as lower internal resistance. Other advantages of the present invention will become apparent from a perusal of the following detailed description of a presently preferred embodiment or best mode of the invention taken in connection with the accompanying drawings.

PRESENTLY PREFERRED EMBODIMENT

Figure 1:
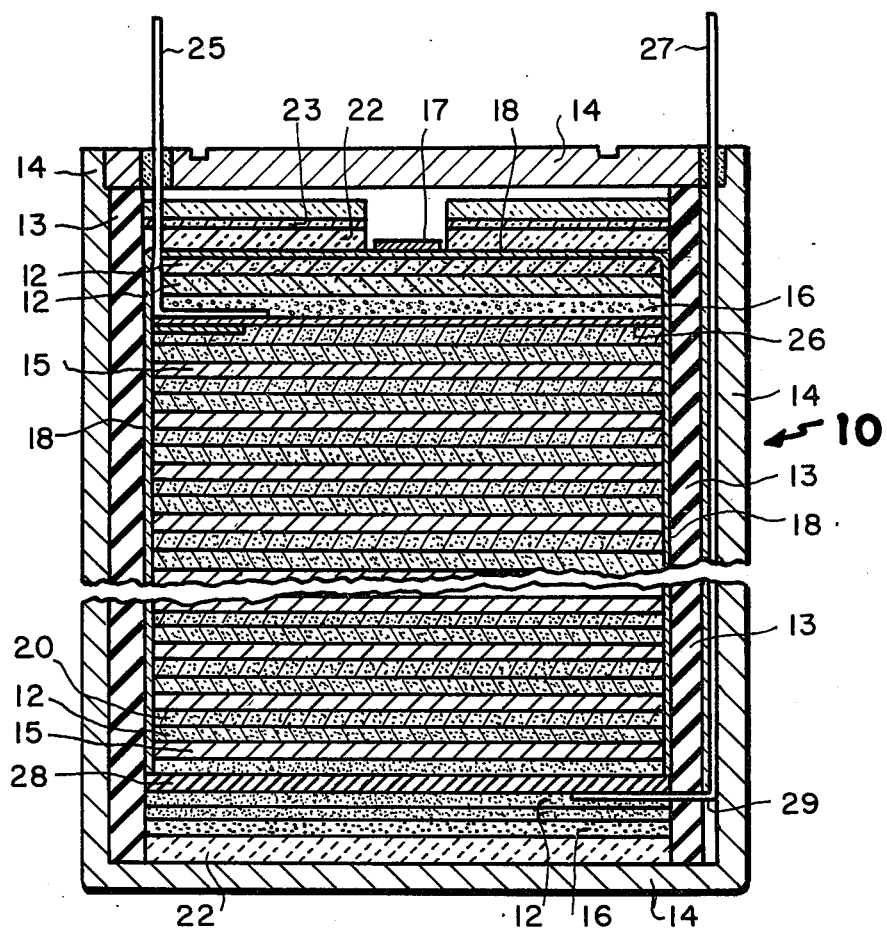
FIG. 1 is a sectional elevation of a thermal battery comprising a stacked array of electrochemical cells.
Figure 2:
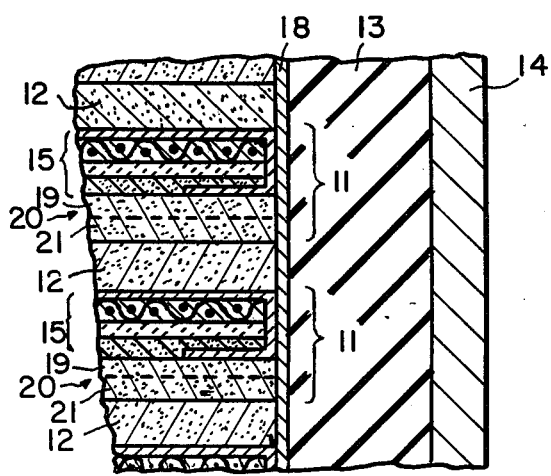
FIG. 2 is an exploded view of a number of electrochemical cells shown in FIG. 1.

With reference to FIG. 1, an improved thermal battery 10 of the present invention includes a plurality of stacked electrochemical cell elements 11, each preferably being in the shape of a thin disc or wafer together with an ignitable chemical heat source 12. Cells 11 are surrounded by thermal and electrical insulation 13 and are maintained in compression by metal housing 14. Each cell comprises an anode assembly 15 and a homogeneous wafer mixture of electrolyte, depolarizer, and a cathode current collector. As shown, in FIG. 2, the electrolyte and depolarizer are incorporated into a two-layer anolyte/catholyte wafer 20. Preferably, the cathode current collector is incorporated into or comprises combustible composition 12 which provides electrical connection between the cells. Combustible composition pellet 16 provides thermal energy to the outside of the bottom cell and top cells of the cell stack. An electrical match or squib 17 is provided to activate the battery and is connected to electrical lead not shown and is in contact with fuse strip 18 which is ignited by electrical match 17 and which, in turn, ignites each wafer of combustible material 12. Insulators 22 are positioned on the end of the cell stack to serve as a temperature buffer and preferably comprise asbestos discs. Additional insulator 23 is interposed between top insulators 22.

Positive current collector 25 is connected to metal current collector 26 and extends through the insulation and housing, and is suitably sealed. Negative terminal 27 is electrically connected to metal current collector 28 and combustible composition pellet 12 by means of lead 29.

Figure 3:
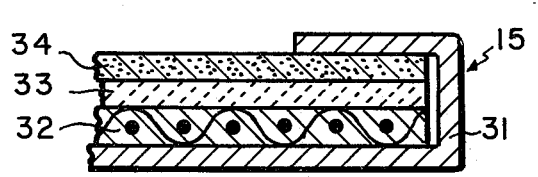
FIG. 3 is a cross-sectional view of an anode assembly suitable for use in the present invention.

With reference to FIG. 3, the anode assembly 15 comprises an impervious metal housing 31 of thin stock, three to ten mils, of an easily cold-formed metal, such as iron, carbon steel, stainless steel or nickel. Positioned adjacent the inner bottom surface of metal cup 31 is the active metal anode, a calcium bimetal or lithium disc 32. Preferably, the active metal anode 32 comprises an iron or stainless steel wire mesh screen (approximately 40 mesh) which is dipped in molten lithium at a temperature of about 500° C.-600° C., as described in U.S. Pat. Nos. 3,891,460 and 3,930,888.

Positioned adjacent active metal anode 32 is asbestos disc 33. Overlying asbestos disc 33 is a wafer 34 preferably comprising LiCl-KCL eutectic or other fused salt used as the electrolyte. The anode assembly 15 is subjected to a compressive force of approximately 750 psi prior to utilization in the stacked array.

Anolyte/catholyte wafer 20 comprises anolyte layer 19 which is a mixture of an inorganic absorbent powder binder with an electrolyte. Anolyte layer 19 may comprise a single salt or a mixture of salts having melting points applicable to the desired cell operating temperature and that, for the most part, do not undergo action, other than electrochemical, with other cell components during storage or operation of the cell. It is preferred that a low melting mixture of alkali metal halides be used such as a lithium chloride/potassium chloride eutectic. Preferably, anolyte layer 19 comprises 86% by weight lithium chloride/potassium chloride eutectic and 14% by weight silica (Cab-O-Sil) ®. The electrolyte binder mixture for use as the anolyte layer is prepared by granulating the eutectic and mixing it with a granulated mixture of silica. This mixture is fused to a temperature of between 380° C. to 395° C. for approximately 16 hours. The fused mixture is then granulated and placed through a 60 and 250 mesh screen. All −60 and +250 materials are utilized for the anolyte layer.

Catholyte layer 21 comprises a mixture of 25% electrolyte binder mix (material prepared for anolyte layer 19) and 75% by weight iron pyrite. It is necessary to utilize a binder to stabilize the $FeS_2$ depolarizer against shock at operating temperature. The iron pyrite is utilized in pellet form having a density preferably greater than 2.4.

Wafer 20 is prepared by placing in a press cavity a layer of anolyte material and a layer of catholyte material and pressing into wafer form. For example, a wafer having a diameter of approximately 1.75 inches and pressed to between 0.026 to 0.029 inches in thickness, weighs 2.7 grams of which the anolyte layer is equal to 1.35 grams. The average density of the wafer is approximately 2.4.

The internal resistance of battery in accordance with the present invention using an iron pyrite depolarizer having an active area of 2.35 square inches was compared with a two-stack battery utilizing a vanadium pentoxide depolarizer having an active surface area of slightly more than 3.0 square inches. A summary of the test results is set forth below.

| | INTERNAL RESISTANCE (ohms) [batteries pulsed at 10 sec.] | |
|---|---|---|
| Temp ° F | Depolarizer $FeS_2$ | Depolarizer $V_2O_5$ |
| + 140 | .212 − .232 | .286 − .297 |
| − 25 | .244 − .246 | .354 − .383 |

The start times of lithium anode batteries in accordance with the present invention and lithium anode batteries using a calcium chromate depolarizer were compared. A summary of the tests is set forth below.

| | START TIME (Seconds) at − 65° F | |
|---|---|---|
| | $FeS_2$ | $CaCrO_4$ |
| + 25 volt section | .490 | .570 − .590 |
| − 25 volt section | .450 | .532 − .555 |

Also, the internal impedances of single cells at 500° C. were compared. These tests show that:

| | INTERNAL IMPEDANCE (ohms) | |
|---|---|---|
| | $Ca/FeS_2$ | $Ca/CaCrO_4$ |
| After 5 minutes | .11 | .21 |
| 10 | .13 | .22 |
| 15 | .14 | .24 |
| 20 | .18 | .27 |
| 25 | .24 | .31 |

Thermal batteries utilizing the iron pyrite depolarizer of the present invention have a lower internal resistance with a resulting smaller voltage drop under pulsed loads than similar batteries with conventional depolarizers. Additionally, faster start times are provided with batteries using the iron pyrite depolarizer.

While a presently preferred embodiment of the invention has been shown and described, it may be otherwise embodied within the scope of the appended claims.

What is claimed is:

1. A thermal primary battery comprising at least one cell element including an anode which melts at the operating temperature of the battery and which comprises a metal selected from the group consisting of alkali metals, alkaline earth metals and alloys thereof, and a homogeneous mixture of a fusible electrolyte, a depolarizer consisting essentially of iron pyrite and a bonder, and a combustible heat generating pellet for melting the anode and fusing said electrolyte.

2. A thermal primary battery as set forth in claim 11 wherein said anode is a metal selected from the group consisting of lithium, calcium and alloys thereof.

3. A thermal primary battery as set forth in claim 1 wherein said battery comprises a plurality of recurring stacked cell elements having combustible heat generating pellet positioned between each of said stacked cell elements.

4. A thermal primary battery comprising a plurality of stacked cell elements including an anode assembly having a fusible metal selected from the group consisting of alkali metals, alkaline earth metals and alloys thereof melting below the operating temperature of the battery, a porous insulator member positioned against said fusible metal, a fused solidified eutectic electrolyte salt positioned to overlie said porous insulator, and a metal housing covering said fusible metal and the sides of said metal, insulator and solidified salt; a homogeneous mixture of fusible electrolyte, depolarizer consisting of iron pyrite and a binder; and a combustible heat generating pellet positioned between each of said cell elements.

5. In a thermal primary battery as set forth in claim 4 wherein said electrolyte and depolarizer comprise two layers, said first layer consisting of electrolyte and binder and said second layer consisting of a major portion of iron pyrite and a minor portion of electrolyte and binder.

6. In a thermal primary battery having an anode comprising a fusible metal selected from the group consisting of alkali metals and alloys thereof, a homogeneous mixture of electrolyte, depolarizer and binder, and a combustible heat generating pellet, the improvement comprising in combination therewith the depolarizer consisting essentially of iron pyrite within said homogeneous mixture.

7. In a thermal primary battery as set forth in claim 6 wherein said homogeneous mixture of electrolyte, depolarizer and binder comprises a wafer.

8. In a thermal primary battery as set forth in claim 6 wherein said homogeneous mixture of electrolyte and binder comprise a first layer of a wafer and wherein a second layer comprises a homogeneous mixture of iron pyrite, electrolyte and binder.

9. In a thermal primary battery as set forth in claim 8 wherein said second layer comprises approximately 75% by weight iron pyrite and 25% by weight electrolyte and binder.

* * * * *